US008523571B1

(12) United States Patent
Kissoon et al.

(10) Patent No.: US 8,523,571 B1
(45) Date of Patent: Sep. 3, 2013

(54) FAMILY ORGANIZATION AND COMMUNICATION TOOL

(75) Inventors: Jainarain R. Kissoon, Columbia Heights, MN (US); Deonarine Kissoon, Prior Lake, MN (US); Kathleen Kissoon, Prior Lake, MN (US); Lawrence Patterson, Minneapolis, MN (US); Dara Wegener-Volker, Andover, MN (US); Paul Volker, Andover, MN (US)

(73) Assignee: Avirat, Inc., St. Louis Park, MN (US)

( * ) Notice: Subject to any disclaimer, the term of this patent is extended or adjusted under 35 U.S.C. 154(b) by 1297 days.

(21) Appl. No.: 11/075,536

(22) Filed: Mar. 9, 2005

Related U.S. Application Data

(60) Provisional application No. 60/551,657, filed on Mar. 9, 2004.

(51) Int. Cl.
*G06Q 10/00* (2012.01)

(52) U.S. Cl.
USPC ............ 434/108; 434/236; 434/238; 715/764

(58) Field of Classification Search
CPC .................................................. G06Q 10/00
USPC .................... 434/108, 236, 238; 705/8–9, 1; 715/703, 764, 963, 733
See application file for complete search history.

(56) References Cited

U.S. PATENT DOCUMENTS

| | | | | |
|---|---|---|---|---|
| 5,761,646 A | * | 6/1998 | Frid-Nielsen et al. | 705/9 |
| 5,790,974 A | * | 8/1998 | Tognazzini | 455/456.5 |
| 5,838,966 A | * | 11/1998 | Harlan | 715/866 |
| 5,855,006 A | * | 12/1998 | Huemoeller et al. | 705/9 |
| 5,867,281 A | * | 2/1999 | Nozoe et al. | 358/402 |
| 6,047,260 A | * | 4/2000 | Levinson | 705/9 |
| 6,269,341 B1 | * | 7/2001 | Redcay, Jr. | 358/1.15 |
| 6,369,840 B1 | * | 4/2002 | Barnett et al. | 715/853 |
| 6,381,580 B1 | * | 4/2002 | Levinson | 705/8 |
| 6,441,836 B1 | * | 8/2002 | Takasu et al. | 715/835 |
| 6,457,062 B1 | * | 9/2002 | Pivowar et al. | 709/248 |
| 6,466,236 B1 | * | 10/2002 | Pivowar et al. | 715/835 |
| 6,544,295 B1 | * | 4/2003 | Bodnar | 709/219 |

(Continued)

OTHER PUBLICATIONS

Website printout: TimeToParent.com, 2 pages, Copyright 2002-2003.

(Continued)

*Primary Examiner* — Xuan Thai
*Assistant Examiner* — Alvin Carlos
(74) *Attorney, Agent, or Firm* — Schwegman, Lundberg & Woessner, P.A.

(57) ABSTRACT

A family organization and communication tool is preferably provided via a web site that enables internet access by both parents and their children. The tool provides features for the managing, scheduling and sharing of information among the parents and children of blended families. Specifically, the tool provides for an access schedule calendar to which can be posted specific events requiring the pick up and drop off responsibilities of a parent. Additionally, the tool provides a means for electronically requesting a swap or trade in days of responsibility for a child and the tool provides for an "ask and approve" expense log for the sharing of children's expenses among parents. The tool further provides for date and time stamping of access by the parents or children to each web page within the tool and for protected entries, entries that can only be edited or deleted by the original creator.

13 Claims, 22 Drawing Sheets

(56) References Cited

U.S. PATENT DOCUMENTS

| | | | |
|---|---|---|---|
| 6,675,356 B1* | 1/2004 | Adler et al. | 715/200 |
| 6,785,868 B1* | 8/2004 | Raff | 715/205 |
| 6,839,707 B2* | 1/2005 | Lee et al. | 707/8 |
| 6,993,596 B2* | 1/2006 | Hinton et al. | 709/250 |
| 7,003,735 B2* | 2/2006 | Edlund et al. | 715/810 |
| 7,027,996 B2* | 4/2006 | Levinson | 705/8 |
| 7,039,596 B1* | 5/2006 | Lu | 705/8 |
| 7,159,178 B2* | 1/2007 | Vogt et al. | 715/733 |
| 7,274,375 B1* | 9/2007 | David | 345/619 |
| 7,334,000 B2* | 2/2008 | Chhatrapati et al. | 707/104.1 |
| 7,340,691 B2* | 3/2008 | Bassett et al. | 455/456.5 |
| 7,353,465 B2* | 4/2008 | Callaway et al. | 705/8 |
| 2002/0013852 A1* | 1/2002 | Janik | 709/231 |
| 2002/0038234 A1* | 3/2002 | Fu et al. | 705/8 |
| 2002/0074792 A1* | 6/2002 | Newell | 283/2 |
| 2002/0077879 A1* | 6/2002 | Uchida et al. | 705/9 |
| 2002/0112006 A1* | 8/2002 | Kuriki et al. | 709/206 |
| 2002/0123936 A1* | 9/2002 | Hansen et al. | 705/26 |
| 2002/0152113 A1* | 10/2002 | Butz | 705/11 |
| 2002/0156672 A1* | 10/2002 | Burko | 705/9 |
| 2002/0194048 A1* | 12/2002 | Levinson | 705/9 |
| 2002/0196280 A1* | 12/2002 | Bassett et al. | 345/751 |
| 2003/0045301 A1* | 3/2003 | Wollrab | 455/456 |
| 2003/0129569 A1* | 7/2003 | Callaway et al. | 434/108 |
| 2003/0158848 A1* | 8/2003 | Finney | 707/10 |
| 2003/0171971 A1* | 9/2003 | Lovekin et al. | 705/9 |
| 2004/0012618 A1* | 1/2004 | Finney | 345/703 |
| 2004/0039254 A1* | 2/2004 | Stivoric et al. | 600/300 |
| 2004/0109025 A1* | 6/2004 | Hullot et al. | 345/764 |
| 2004/0133440 A1 | 7/2004 | Carolan et al. | |
| 2004/0172279 A1* | 9/2004 | Carolan et al. | 705/1 |
| 2004/0186884 A1* | 9/2004 | Dutordoir | 709/206 |
| 2004/0193673 A1* | 9/2004 | Samji et al. | 709/200 |
| 2005/0033615 A1* | 2/2005 | Nguyen et al. | 705/5 |
| 2005/0033698 A1* | 2/2005 | Chapman | 705/51 |
| 2005/0132300 A1* | 6/2005 | Luhrs | 715/776 |
| 2006/0206522 A1* | 9/2006 | Austin et al. | 707/104.1 |

OTHER PUBLICATIONS

Website printout: ShareKids.com, 1 page, Copyright 1981-2003.

* cited by examiner

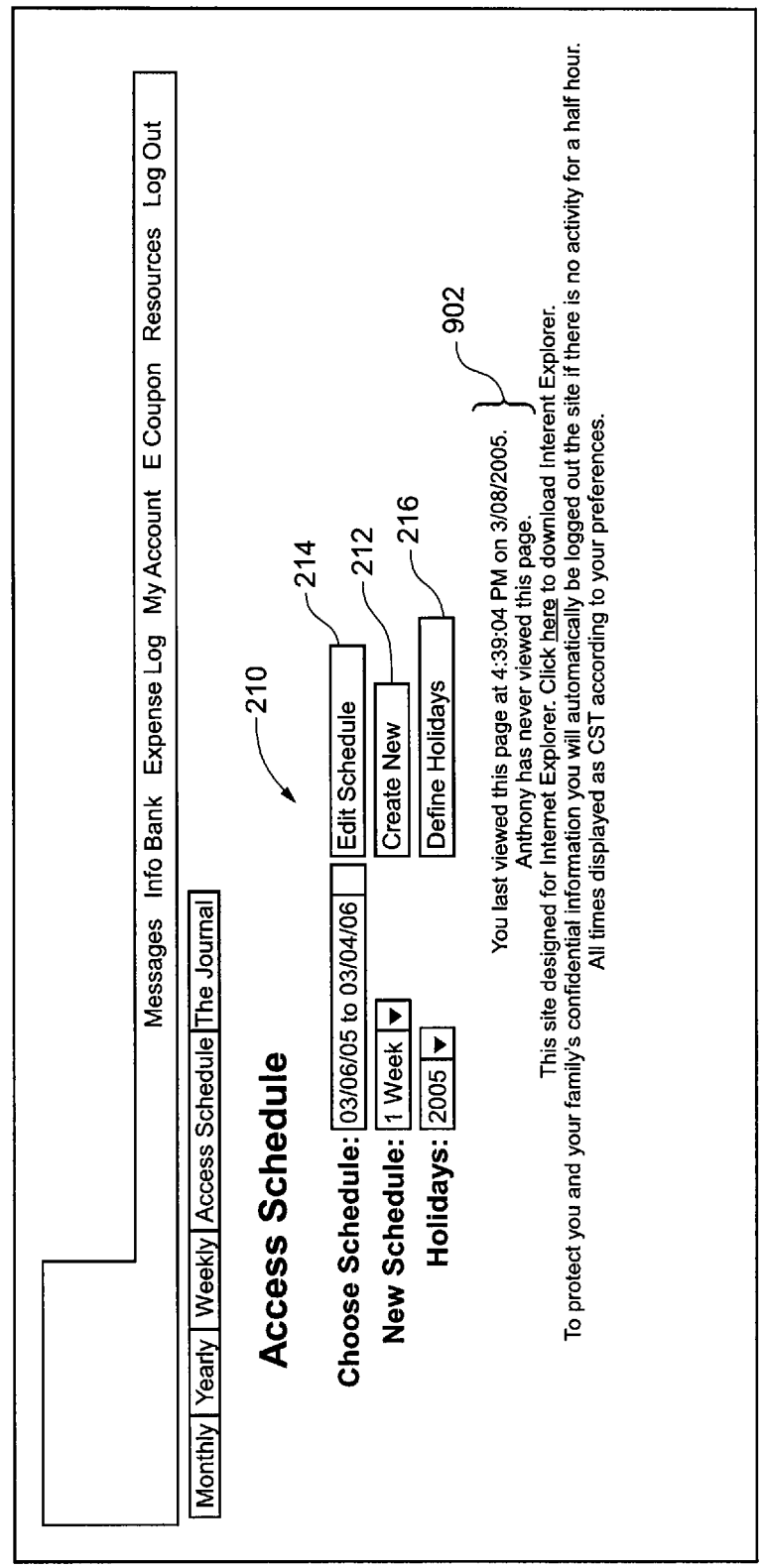

Fig. 4

Messages  Info Bank  Expense Log  My Account  E Coupon  Resources  Log Out

| Monthly | Yearly | Weekly | Access Schedule | The Journal |

Access Schedule ← 212, 214

You already have an Access Schedule defined. It started on 03/06/2005 and ends on 03/04/2006.

You may make changes to it below.

Select your Start and End dates and the schedule for that time period.

*Start Date: 3 ▶ 6 ▶ 2005 ▶  — 218    *End Date: 3 ▶ 14 ▶ 2006 ▶ — 220

| Sunday | Monday | Tuesday | Wednesday | Thursday | Friday | Saturday |
|--------|--------|---------|-----------|----------|--------|----------|
| ○ Open | ○ Open | ○ Open  | ○ Open    | ○ Open   | ○ Open | ○ Open   |
| ● ○    | ● ○    | ● ○     | ● ○       | ○ ●      | ○ ○    | ○ ●      |
| □ □    | □ □    | □ □     | ■ □       | □ □      | ■ □    | ■ □      |

222 (multiple) ... 224 (multiple)

□ Kimberly Baxter's    ■ Anthony's

[Update Access Schedule] — 902

You last viewed this page at 4:39:41 PM on 3/08/2005.
Anthony has never viewed this page.
This site designed for Internet Explorer. Click here to download Interent Explorer.
To protect you and your family's confidential information you will automatically be logged out the site if there is no activity for a half hour.
All times displayed as CST according to your preferences.

Fig. 5

Messages  Info Bank  Expense Log  My Account  E Coupon  Reso

| Monthly | Yearly | Weekly | Access Schedule | The Journal |

Holiday Access Schedule

— 216

Holiday Access Schedule

226 — Change Year: [2005 ▼] [          ] — 230
— 222

| Common Holidays | | |
|---|---|---|
| New Year's Day (1/1): | ☑ | ○ Default  ⦿☐ ○☐ |
| Valentine's Day (2/14): | ☑ | ○ Default  ⦿☐ ○☐ |
| St. Patrick's Day (3/17): | ☑ | ○ Default  ⦿☐ ○☐ |
| Mother's Day (5/8): | ☑ | ○ Default  ⦿☐ ○☐ |
| Memorial Day (5/30): | ☑ | ○ Default  ○☐ ⦿■ |
| Father's Day (6/19): | ☑ | ○ Default  ○☐ ⦿■ |
| Independence Day (7/4): | ☑ | ⦿ Default  ○☐ ○☐ |
| Labor Day (9/4): | ☑ | ⦿ Default  ○☐ ○☐ |
| Halloween (10/31): | ☑ | ⦿ Default  ○☐ ○☐ |
| Veteran's Day (11/11): | ☑ | ⦿ Default  ○☐ ○☐ |
| Christmas (12/25): | ☑ | ⦿ Default  ○☐ ○☐ |
| New Year's Eve (12/31): | ☑ | ⦿ Default  ○☐ ○☐ |

228 ◁

224

[Update Holiday(s)]  — 232

Custom Holidays
(click to Edit or Delete)
*No Custom Holidays Defined for 2005*

[Update Holiday(s)]

| Add a Custom Holiday | |
|---|---|
| Description | Dates |
| [          ] | One Day ⦿  Start Date [          ] |
| | Multi Day ○ |

— 234

236 — 238 — [Add Holiday]

New Calendar Event      [Close]

Required Fields are marked with *    —242

General Information —243    —244
- *Description: [ ]
- Comments: [ ]
- Location: [ 245 ]

Dates & Times
- Does Event Span Multiple Days? ○ Yes ◉ No —246
- Date: [3/8/2005] —247
  [Select Date]
  (Format: MM/DD/YYYY or MM/DD/YY)
- All Day Event: ○ Yes ◉ No —248
- * Start Time: [04][v]:[31][v][PM][v]    —249    * End Time: [05][v]:[31][v][PM][v] —250
- [Define Repeat Pattern] —251

User Information
- Event for which Parent: [None][v] —252
- Drop off Parent: [None][v]   —253   Pick Up Parent: [None][v] —254
- Event for: [☑ Ian Baxter] —255
- —256    —257
- Send reminder: [Anthony / Anthony Baxter / Ian Baxter]    When to send reminder?: [Don't send a reminder][v]
- You can send a reminder to multiple people by holding down CTRL (APPLE key on Macs) and clicking.

Misc.
- Icon: [ ] [Select Icon] —258
- Notes: [ 259 ]

Fig. 7

Messages  Info Bank  Expense Log  My Account  E Coupon  Resources  Log Out

| Monthly | Yearly | Weekly | Access Schedule | The Journal |

Weekly Calendar

⟨Prev.⟨ [3 ▼] [6 ▼] [2005 ▼] [Go To] ⟩Next⟩

Week of Sunday, March 06 2005

Sunday Mar. 06 2005
*No Events*

Monday Mar. 07 2005
*No Events*

Tuesday Mar. 08 2005
*No Events*

Wednesday Mar. 09 2005
*No Events*

Thursday Mar. 10 2005  ●
| 4:30PM - Hockey Practice - 5:30PM |

Friday Mar. 11 2005
*No Events*

Saturday Mar. 12 2005
*No Events*

| Access Sch. | Printable | Trade Swap | New Event | Export |

You last viewed this page at 3:38:21 PM on 3/08/2005.
Anthony has never viewed this page.
This site designed for Internet Explorer. Click here to download Interent Explorer.
To protect you and your family's confidential information you will automatically be logged out the site if there is no activity for a half hour.
All times displayed as CST according to your preferences.

Fig. 8

| | Messages | Info Bank | Expense Log | My Account | E Coupon | Resources | Log Out |

Monthly | Yearly | Weekly | Access Schedule | The Journal

Monthly Calendar

— 260

| February | | April |
|---|---|---|
| Su Mo Tu We Th Fr Sa | ‹Prev. [3▼] [2005▼] [Go To] Next› | Su Mo Tu We Th Fr Sa |
| 1 2 3 4 5 | | 1 2 |
| 6 7 8 9 10 11 12 | MARCH | 3 4 5 6 7 8 9 |
| 13 14 15 16 17 18 19 | | 10 11 12 13 14 15 16 |
| 20 21 22 23 24 25 26 | 2005 | 17 18 19 20 21 22 23 |
| 27 28 | | 24 25 26 27 28 29 30 |

| Sunday | Monday | Tuesday | Wednesday | Thursday | Friday | >Saturday |
|---|---|---|---|---|---|---|
| February 27 | 28 | March 1 | 2 | 3 | 4 | 5 |
| 6 | 7 | 8 | 9 | 10 | 11 | 12 |
| 13 | 14 | 15 Swimming Lesson 3:30-4:15 | 16 Dentist 11:00-11:30 | 17 | 18 | 19 |
| 20 | 21 | 22 Swimming Lesson 3:30-4:15 | 23 | 24 | 25 | 26  261 |
| 27 | 28 | 29 Swimming Lesson 3:30-4:15 | 30 | 31 | April 1 | 2 |

262 — ⌐ 262

210 — 283 — 268 — 242 — 285

| Access Sch. | Printable | Trade Swap | New Event | Export |

- ⓘ Change Approved/Rejected
- ⓘ Change Request
- ⓘ Conflict

▦ Kimberly Baxter's   ▨ Ian Baxter's
▦ Anthony's          ▨ Angus Baxter's
                     ▨ Isabelle Baxter's You last viewed this page at 10:59:22 PM on 3/09/2005.
Anthony has never viewed this page.
This site designed for Internet Explorer. Click here to download Interent Explorer.
To protect you and your family's confidential information you will automatically be logged out the site if there is no activity for a half hour.
All times displayed as CST according to your preferences.

Request Trade/Swap Days
Report Trade/Swap History

To switch days with the other parent, choose which parent you would like to have responsibility for the children, the date or date range that you would like to switch, and if you want to swap with another day.

Optionally, you can choose a "Respond By Date" and "Reason" to let the other parent know why you are making the request.

The other parent will see the Change Request for the days you chose, and he/she will be given the option to accept or reject the request.

| My Day(s) ⦿ | Single Day ⦿ | No Trade ⦿ |
|---|---|---|
| Anthony's Day(s) ○ | Multiple Days ○ | Trade for Another Day ○ |

269 — Date: [ ] — 271  — 272
Select Date — 270

Respond By: [ ] — 273
Select Date

Reason: [ ] — 274

[Submit] [Cancel]

The Journal - New Entry | Close

Date: [_____279_____] [Select]

Entry: [ 280 ] ← 278

Visual To: ☐ Ian Baxter    ☐ Angus Baxter
281 — ☐ Isabelle Baxter

Public Entry: ● Yes   — 282
              ○ No

[Submit]

Fig. 15

New Activity [Close]

All fields marked with a * are required

- **\* Label:** [    ]
- Description: [    ]
- Instructor: [    ]
- Address: [    ]
  [    ]
- City: [    ]
- State: [-Select a State- ▼]
- Zip: [    ]
- Personal Phone: [    ]
- Biz Phone: [    ]
- Biz Phone Ext: [    ]
- Personal Email: [    ]
- Website: [http://]
- Days: [    ]
- Times: [    ]
- Notes: [    ]
- Public: ● Public
  ○ Private

[Create Activity] [Close]

Edit Family Vitals [Close]

Social Security: [ ]
Birthday: [ ] [Select Date]
(FORMAT: MM/DD/YYYY)
Height: [ ]
Weight: [ ]
Eye Color: [ ]
Hair Color: [ ]
ID Number: [ ]
Sex: ◉ Male ○ Female
Shirt Size: [ ]
Pants Size: [ ]
Dress Size: [ ]
Shoe Size: [ ]
Belt Size: [ ]
Other Sizes: [ ]
* Private: ○ Yes ◉ No
[Create] [Close]

My Files - Add a File  [Close]

1. Click the "Browse" button to select the file that you want to upload, or you can type the path to the file in the box below.
2. If you would like, you may give the file a description.
3. Click the "Add File: button. The transfer of a file may require 30 seconds to up to 10 minutes File to upload: [_____] [Browse]
File Type: [Document]
Is this file private? ☐
Description: [_____]

[Add File] [Cancel]

Calendar  Messages  Info Bank  Expense Log  My Account  E Coupon  Resources  Log Out

| Summary | Your Log | Others Log | Setup |

Expense Log - Summary ~504

502

| | Date | Expense ~506 | Type 508 | Amount 510 | Child 512 | Parent 514 | Status 516 | Paid 520 |
|---|---|---|---|---|---|---|---|---|
| Delete ☐ | 03/08/2005 | Hockey Fees | General | $300.00 | ☐ Kimberly Baxter's<br>☐ Anthony's | ☐<br>☐ | ■<br>■ | Yes<br>No |
| Delete ☐ | 03/08/2005 | Swimming Lessons Fee | General | $275.00 | ☐ Ian Baxter's<br>☐ Angus Baxter's<br>☐ Isabelle Baxter's | | | |

522
524

☐ Approved  P Private  ☐ Refused  ☐ Waiting

Create Expense ~526

You last viewed this page at 3:13:12 PM on 3/09/2005.
Anthony has never viewed this page.
This site designed for Internet Explorer. Click here to download Internet Explorer.
To protect you and your family's confidential information you will automatically be logged out the site if there is no activity for a half hour.
All times displayed as CST according to your preferences.

Fig. 20

New Expense — 525

Close

*Fields marked with a * are required*

- * Date: 03/09/2005 — 530
  FORMAT: mm/dd/yy or mm/dd/yyyy — 532
- * Expense Title: [        ] — 534
- * Type: --- Select Type --- ▼
- * Amount: [        ] — 536
  NOTE: Amount must be a valid number (Do not use a 'S' or ")"
- * Expense For: --- Select User --- ▼ — 538

528

If you would like, you can upload a scanned copy of a receipt for this expense. Any uploading will be added into the My Files area; and will affect your total upload file capacity.

- Receipt File: [        ] [Browse] — 540
- * Private: ⦿ No  ○ Yes — 542

[Create Expense] [Cancel]

FAMILY ORGANIZATION AND COMMUNICATION TOOL

CLAIM TO PRIORITY

The present application claims priority to U.S. Provisional Application No. 60/551,657, filed Mar. 9, 2004, and entitled, "FAMILY ORGANIZATION AND COMMUNICATION TOOL." The identified provisional patent application is hereby incorporated by reference.

FIELD OF THE INVENTION

The present invention relates to non-verbal electronic communication and, more specifically, to non-verbal electronic communications between non-cohabitating parents for the managing, scheduling and sharing of information about their children.

BACKGROUND OF THE INVENTION

The concepts of divorced parents and blended families are commonplace today. As are hectic schedules for both children and their parents. Trying to coordinate such hectic schedules among blended families is often quite difficult. Each family has to attempt to make their plans while respecting the interests of former spouses and the needs of other blended households. The common result, however, is scheduling mishaps due to poor communication. The inability to communicate effectively among former spouses further often results in conflicts that create more stress for everyone involved, both parents and children.

In a world awash in communication technology with virtually everyone having Internet access, there is a need for a web site that enables communicating, scheduling and sharing information with a former spouse that would help remove the stress from all involved lives. The site should be designed for separate households and built with features to accommodate families that live apart. The site should enable managing, scheduling, and sharing information cooperatively and efficiently about shared children in a non-verbal manner.

SUMMARY OF THE INVENTION

The needs described above are in large part addressed by the family organization and communication tool and method of the present invention. The tool is preferably provided via a web site that enables internet access by both parents and their children. The tool provides features for the managing, scheduling and sharing of information among the parents and children of blended families. In a preferred embodiment of the invention, the tool provides an access schedule calendar, whereby parents and children can determine which parent is responsible for a child on a certain day and/or certain event.

An event is presented on the calendar as an event box, wherein the event box provides the viewer of the calendar with an indication of not only the time and date of the event but for which child the event is occurring, which parent is responsible for the drop off of the child, which parent is responsible for the child during the event, and which parent is responsible for picking up the child from the event. In the preferred embodiment, each of these indications is provided through the use of color-coded sections of the event box, wherein each child and parent is assigned a unique color for quick ascertainment of responsibility.

In another preferred embodiment of the invention, the tool provides for the ability of a parent to electronically request the trade or swap of a day or days of responsibility for a child with the other parent. The requesting parent can establish a response date for response from the other parent, which will also act as an expiration if no response is required. A negative or non-response to a request maintains the current color-code status of the access schedule while a positive response to the request results in an automatic color-code update to the access schedule calendar to indicate who is the newly responsible parent In still another preferred embodiment of the invention, the tool enables the user parents to enter and post incurred expenses for their children. The expense is designated with a type indicating whether the expense is to be split between parents, at a predetermined percentage, or whether the expense is to be born by one parent alone. Upon posting a shared expense, the posting parent can electronically ask for and track approval and payment of the expense by the other parent. The expense types are preferably customizable to each users needs and specific situations.

A feature preferably provided in all embodiments of the present invention is that of date and time stamping. Specifically, each accessed web page of the tool is provided with an indication, e.g., a footer at the bottom of the page, with the last date and time each user viewed the page, so that there can be no arguments as to whether an individual actually saw an access schedule, event, or expense log posting. Further, all embodiments of the present invention are preferably provided with protected entries, i.e., only the user who created an entry can edit or delete it, and all historical records are locked unless both parents consent to making the change.

BRIEF DESCRIPTION OF THE DRAWINGS

FIG. 3 depicts an access schedule options page of the present invention.

FIG. 4 depicts a web page of the present invention for creating or editing the access schedule.

FIG. 5 depicts a web page of the present invention for establishing the holiday schedule portion of the access schedule.

FIG. 6 depicts a web page of the present invention for establishing or editing a calendar event.

FIG. 7 depicts the display format of a weekly access schedule calendar.

FIG. 8 depicts the display format of a monthly access schedule calendar.

FIG. 10 depicts a web page of the present invention requesting a trade or swap of access schedule days between parents.

FIG. 11 depicts a journal calendar of the present invention.

FIG. 12 depicts a template for journal entry.

FIG. 15 depicts a "new activity" template of the present invention.

FIG. 16 depicts a template for entry of family vital information.

FIG. 18 depicts a template for uploading a user's personal file to the tool of the present invention.

FIG. 19 depicts the expense log summary created by the tool of the present invention.

FIG. 20 depicts a template for entry of a "new expense" within the expense log.

DESCRIPTION OF THE PREFERRED EMBODIMENTS

A family organization and communication tool of the present invention provides a unique Internet tool and method for scheduling, organizing and sharing information among blended families. Among its features are an access schedule illustrating each child and the responsible parent for each day, activity and holiday. Further, is the ability to trade or swap days in parenting responsibility schedules. As well, a user of the tool can utilize its ask and approve expense log to share child expenses between the parents.

Figure 1:
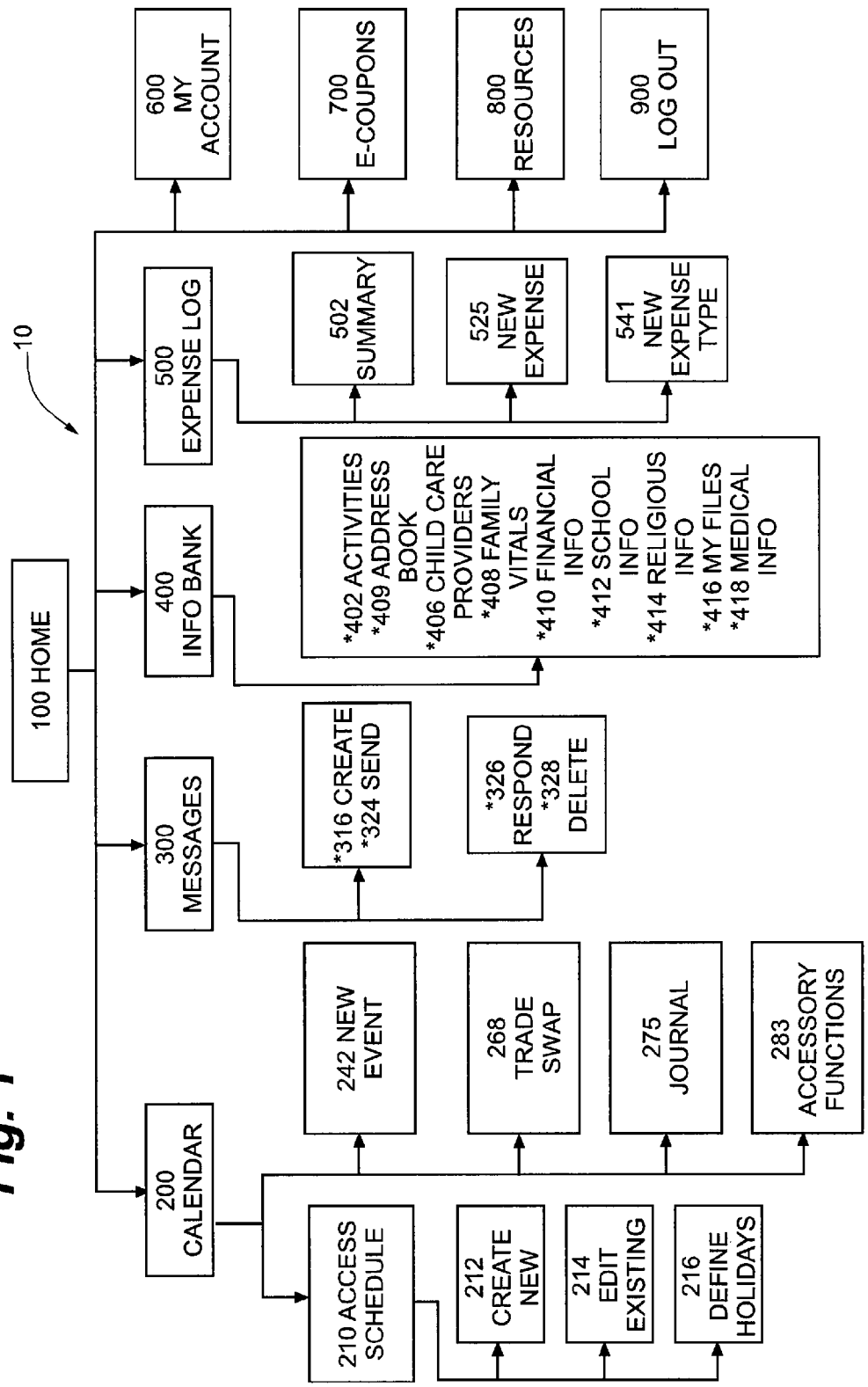
FIG. 1 provides an overview flowchart of the family organization and communication tool of the present invention.
Figure 2:
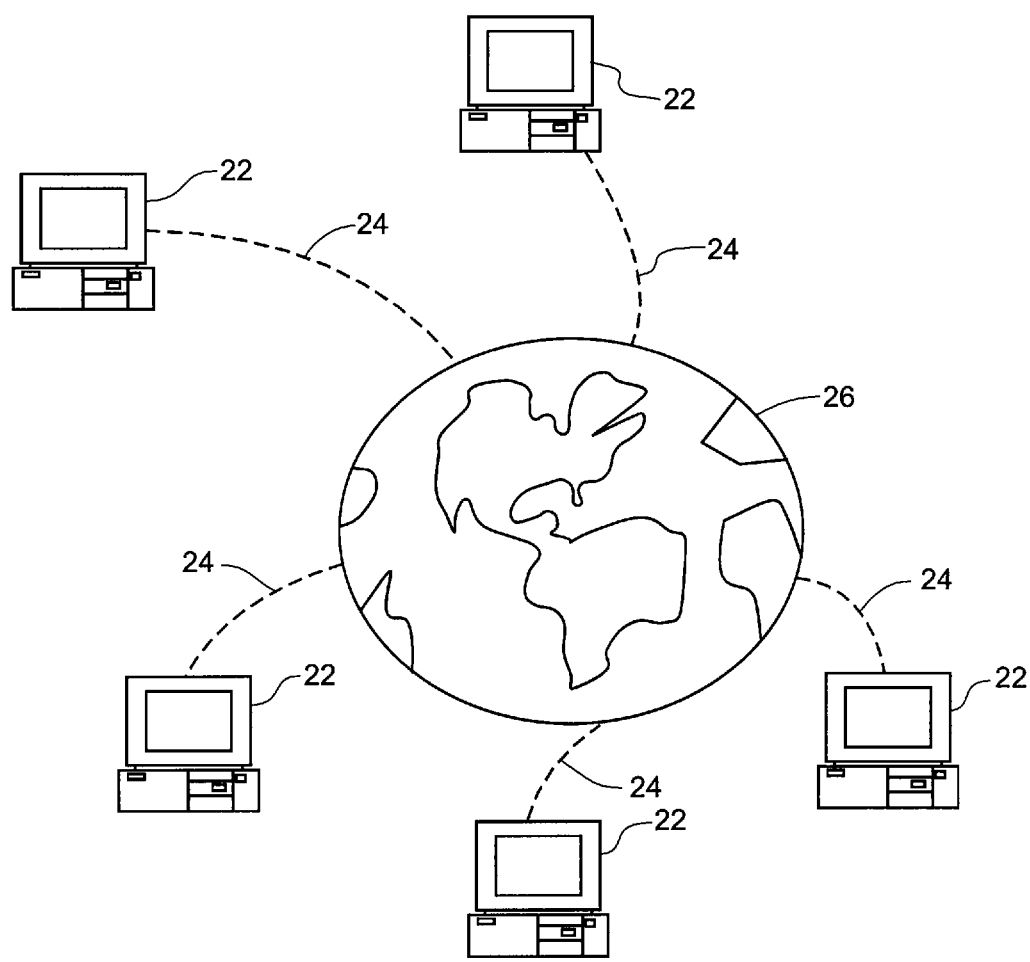
FIG. 2 depicts a typical internet system through which the tool of the present invention may be accessed.

An overview flowchart of the family organization and communication tool (the tool) 10 of the present invention is provided in FIG. 1. As shown, from the Internet home page 100 of the tool 10, a user can access the following functions: (1) calendar 200; (2) messages 300; (3) information bank 400; (4) expense log 500; (5) my account; (6) e-coupons 700; (7) resources 800; and (8) logout 900. FIG. 2 depicts a typical Internet system 20 through which the tool may be accessed. As well known, the Internet system 20 links computers 22 via Internet service providers 24 to the world wide web 26, which is comprised of thousands of web sites whose operation/software is supported by servers (not shown).

I. Calendar Function

Referring once again to FIG. 1, the function of the calendar 200 can now be appreciated. A significant feature of the calendar function 200 is the function of the access schedule 210 (a schedule indicating which parent has the responsibility for a child), wherein a user may create a new access schedule 212, edit an existing access schedule 214, and/or define a holiday schedule 216. FIG. 3 depicts the page of the tool 10 that offers the access schedule options. FIG. 4 depicts the page of the tool 10 that enables the creation, or editing of an existing access schedule. As shown, a user is prompted to enter a start date 218 and an end date 220, typically a span of six months to a year, and is then prompted to enter the parent responsible for access/custody of the child on each day of the week. In the preferred embodiment this entry is simplified by offering color-coded boxes for each parent, i.e., the mother 222 and the father 224, with the option of selecting or de-selecting color-coded boxes. Those same color-coded boxes, 222 and 224, are additionally preferably provided in determining the holiday access schedule, which is enabled by the page of the tool shown in FIG. 5.

The holiday access schedule 216 web page depicted in FIG. 5, enables the user to select a year 226 in which to define their holidays. The page also enables the user to select which common holidays 228 are of concern through use of a check box 230 and to designate which parent will have access/responsibility for the child on that holiday. In this example, the mother has access/responsibility on New Year's, Valentine's, St. Patrick's and Mother's Day, per selected color-coded boxes 222, while the father has access/responsibility for the child on Memorial and Father's Day. The remainder of the holidays are defined as default, i.e., the access/responsibility for the child remains with the default parent. Additional holidays not provided within the common holiday list may be established and added by entering the holiday through the custom holiday option 234. A description 236, the number of days of the holiday 238 and the start date 240 of the holiday can be entered. Once added, the parent having access/responsibility for the child can be selected.

A further feature of the calendar 200 is the ability to establish single and/or recurring events 242 for each child. FIG. 6 depicts a page of the tool 10 that can be used to establish or edit a new event 242. As shown, the new calendar event page enables the entry of a description 243 of the event, as well as additional comments 244 and location information 245 on the event. The user can additionally define the timing of the event by noting a multiple day event per selection 246, entering the date of the event 247, noting an all day event per selection 248, as well as entering a start time 249 and an end time 250. The user can additionally define the event as a repeating event by selecting the define repeat pattern option 251 and selecting the repeat pattern, e.g., daily, weekly, monthly, etc., and at which time the repeat should end. The new calendar event is further defined by user information which includes the selection of which parent is responsible for the child during the event 252, which parent is to drop off the child 253, which parent is to pick up the child 254, and which child the event is for (see check box 255). The user can select whether to send an e-mail reminder about the event to the child and/or parent per selection box 256 and can select at which time before the event the reminder should be sent per selection box 257. At the user's option, they can further define the new calendar event by selecting an icon that represents the event, per selection box 258, and can enter any additional notes 259.

Figure 9:
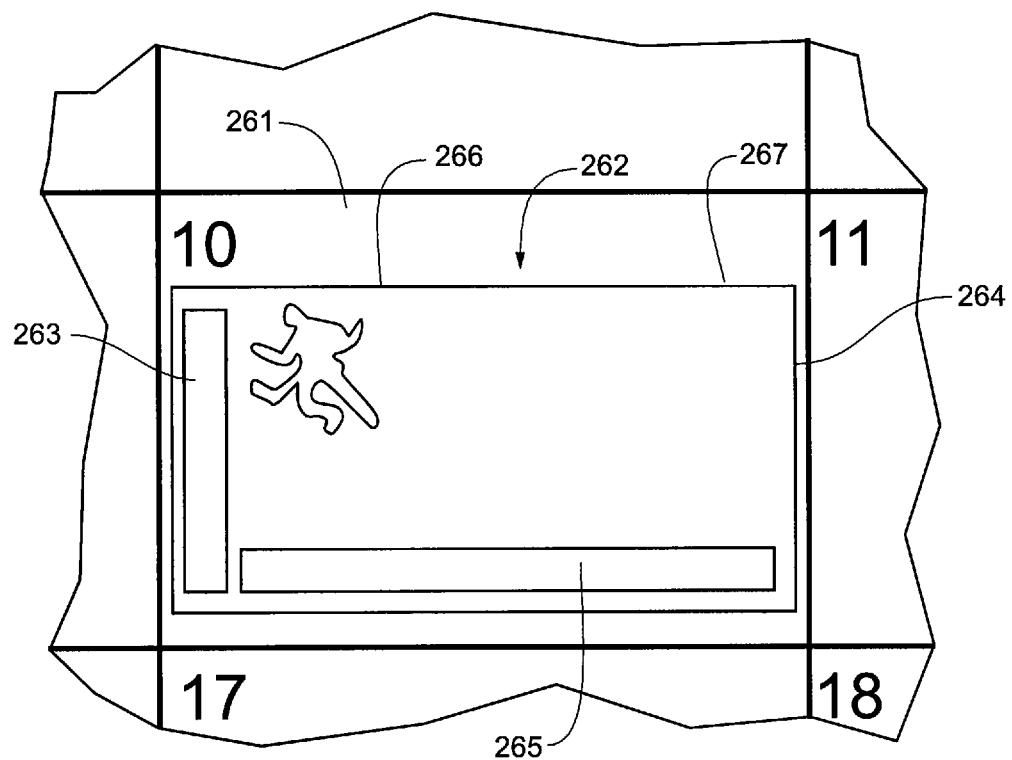
FIG. 9 depicts an example event box from the access schedule calendar.

With the access schedule and various calendar events defined, the user can view the calendar in a weekly, monthly, or yearly format, an example of the monthly format is provided in FIG. 8. The calendar 260 is preferably color-coded wherein the background 261 color-fill for each day represents the access schedule, i.e., which parent has access/responsibility for the child or children on that day. Note that a legend is provided at the bottom of the calendar indicating which colors correspond to each parent and each child. Additionally, the calendar is marked with various calendar events. Each calendar event is indicated by an event box 262 provided on the day the event is to occur. A user may click on the event box 262 to obtain additional details about the event. A close-up view of an example event box 262 is provided in FIG. 9.

Each event box 262 is outlined, to the left, right and bottom, with bars. The bar to the left in the event box 262 is the "drop-off" bar 263, a bar that is color-coded to indicate which parent will be dropping off the child at the noted event. The bar to the right in the event box 262 is the "pick-up" bar 264, a bar that is color-coded to indicate which parent is responsible for picking up the child from the event. The bar to the bottom in the event box 262 the "child indicator" bar 265, a bar that is color-coded to indicate which child is participating in the event. The background 266 of the event box 262 is color-coded to indicate which parent is responsible for the child during the event. And, a data field 267 is provided within the event box 262 to provide a description of the event, with words and/or an icon, as well as the start and stop time of the event. It should be noted that while the use of color-coding and the use of bars are the preferred method of indicating the parents and children involved with the calendar, other methods of indicating the children/parents can be used without departing from the spirit or scope of the invention.

An additional function of the calendar function 200, is the trade/swap function 268, which is enabled through the web page of the tool 10 that is depicted in FIG. 10. This function enables a parent to request to trade a day, forfeit a day, or acquire a day. To switch days with the other parent, the user selects which parent they wish to have responsibility for the child per selection box 269. The user then selects the date for date range that you would like to switch by entering the date in the date box 270 and selecting "single" or "multiple" days, per selection box 271. The user may indicate the desire to trade for another day or not to trade, per selection box 272. Optionally, the user may also set a "respond by date" 273 and/or "reason" 274 to let the other parent know why the user is making the request. Upon submitting the change request, the other parent will see the change request upon the calendar, indicated by a question mark "?" over the event box 262, (see FIG. 8). The other parent will also receive a message through the message function of the tool 10, whereby the other parent can accept or reject the request. The message function is described further below. A log of the request and the response is preferably kept. Upon the acceptance of a request, the calendar is preferably updated by color-coding to indicate the other parent's new responsibility. A conflict in scheduled events is preferably indicated by an exclamation point "!" positioned over the event box.

Figure 11:
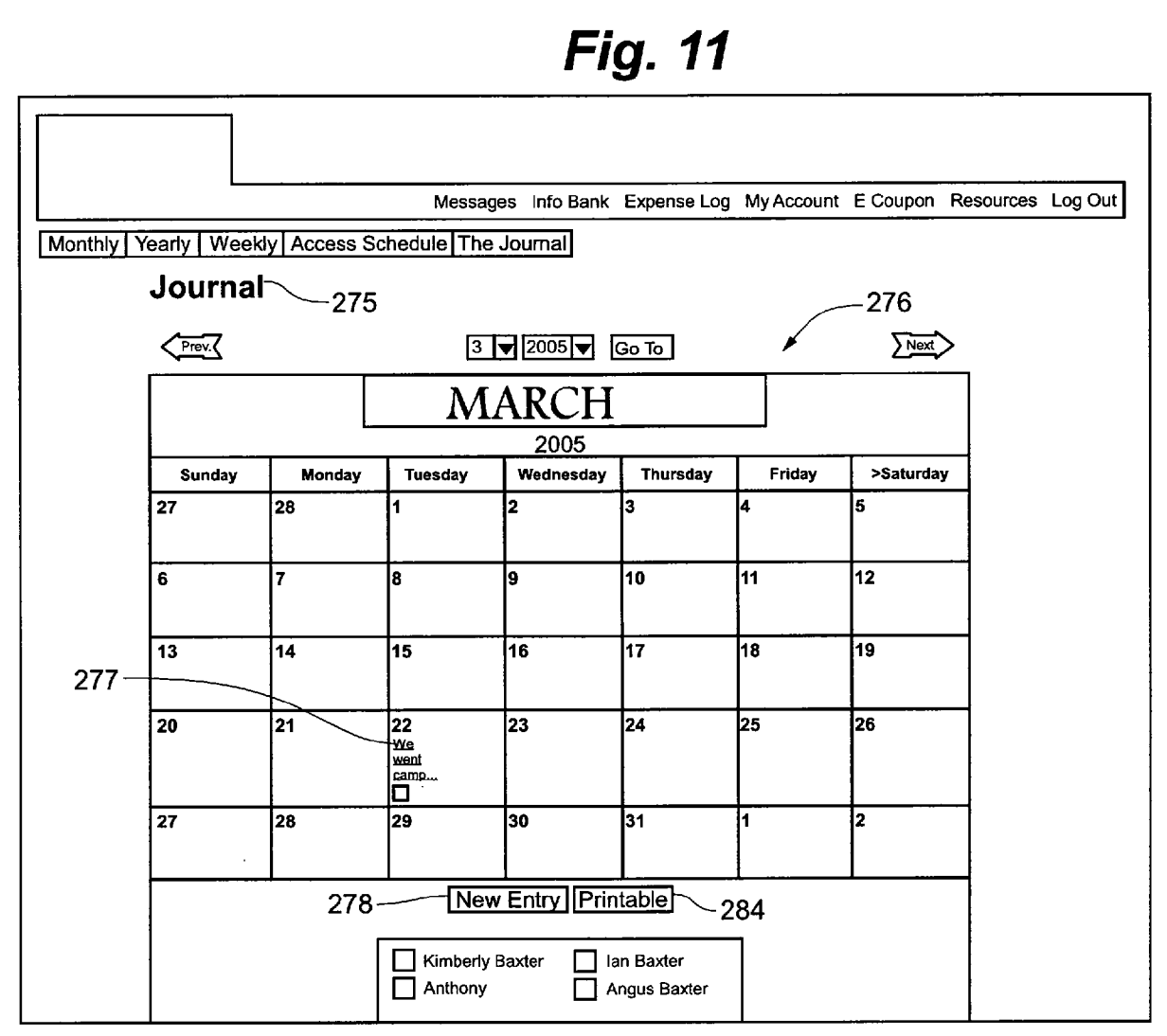

Additional functions of the calendar function 200 of the tool 10 include the ability to journal 275 relative to the calendar. FIG. 11 depicts a journal calendar 276 that is distinct from the access schedule/event calendar described previously. The journal calendar 276 maintains only journal entries and indicates the presence of such a journal entry through a notation 277 on the calendar. The journal calendar 276 is preferably color-coded indicating who wrote the entry and who has access to the entry. Upon selecting a new journal entry 278, the user is presented with a journal entry page like that depicted in FIG. 12. Within the entry 278, the user is prompted to enter or select a date 279 for the entry and to create the desired entry 280. The user may also select to whom the entry will be visible to, per selection box 281 and whether the entry is to be made public, per selection box 282.

Further functions of the calendar function 200 of the tool 10 include accessory functions 283 such as display, print, and export. Both calendar 260 and the journal calendar 275 preferably provide the user not only with the ability to view a weekly, monthly, and yearly calendar format but also provide the ability to click on any entry within the calendar 260, 275 to have the details of the entry displayed on a separate page. Further, both the calendar 260 and the journal calendar 275 are provided with the option of selecting a "printable" option to create a printer-friendly format of the calendar. See FIG. 8, "printable" option 283 and FIG. 11, "printable" option 284, respectively. The calendar 260 is preferably provided with the additional option of exporting the events of the calendar 260 to Outlook or another compatible calendar, see FIG. 8 "export" option 285.

II. Message Function

Figure 13:
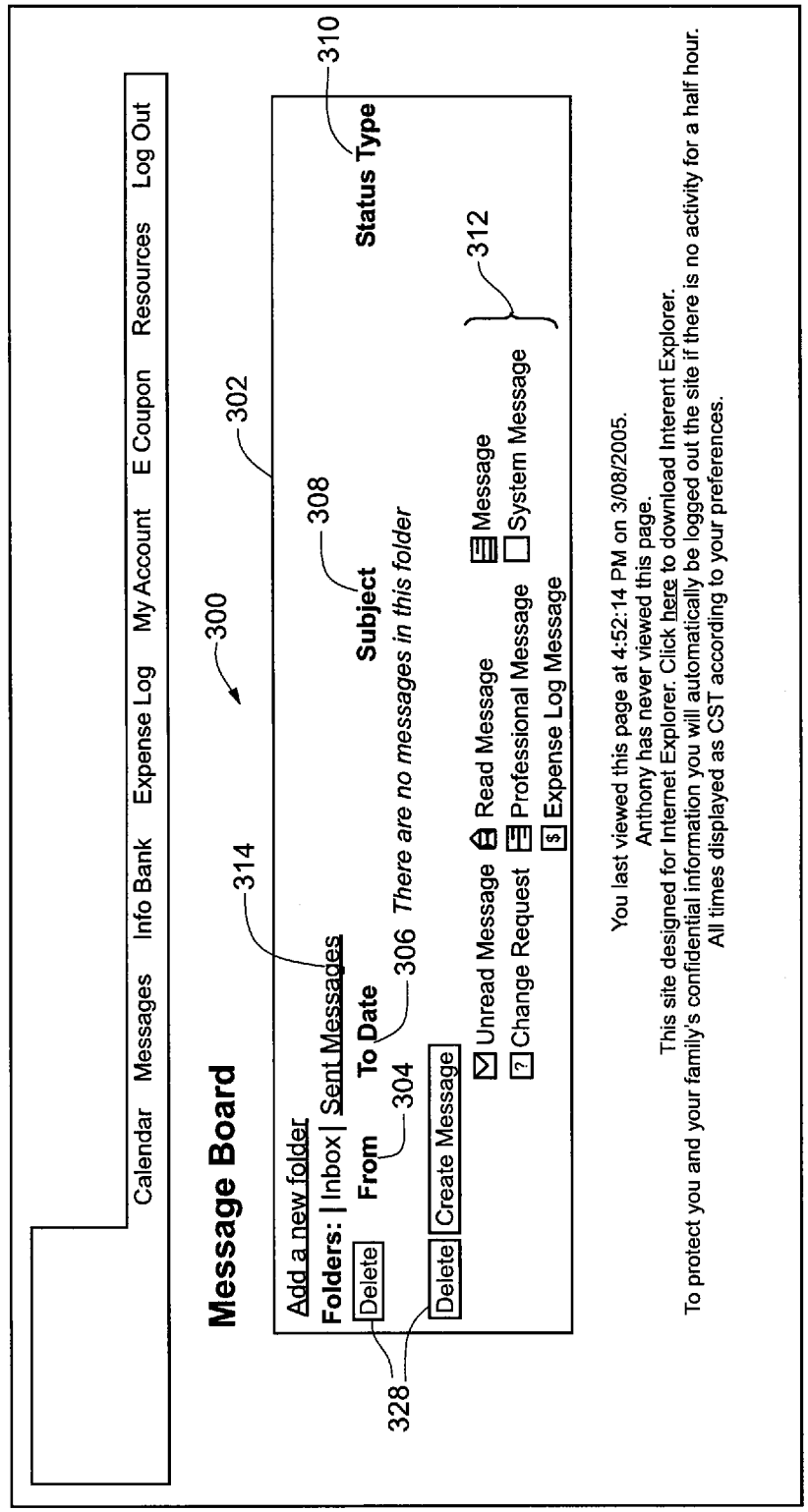
FIG. 13 depicts a message board provided by the tool of the present invention.

The message function 300 presents the user with a message board 302 to which all messages sent to the user via the tool 10 are posted, see FIG. 13. The message board lists the messages providing indication of whom the message is from 304, the date the message was sent 306, the subject of the message 308, and the status type of the message 310. The status of the message is preferably indicated as "read" or "unread" while the type of the message is noted as one or more of the following: (1) message; (2) change request; (3) professional message; (4) system message; and (5) expense log message. The status and types of the messages are preferably listed in a legend 312 on the message board 302 for easy identification. Messages sent by the user are also preferably displayable on the message board 302, per function 314.

Figure 14:
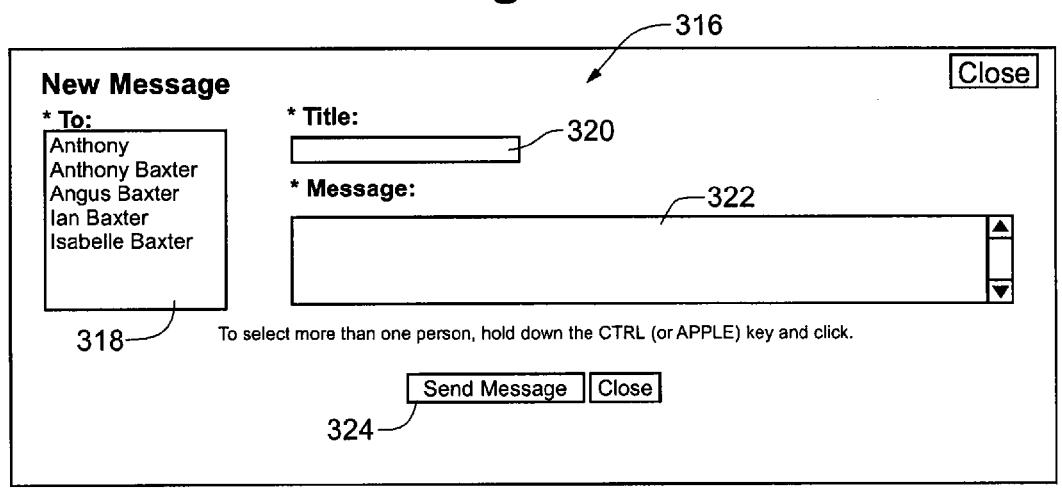
FIG. 14 depicts a "new message" template to create a message to post to the message board.

To create a new message 316, the user is preferably presented with a message template, such as that shown in FIG. 14, where the user is prompted to select from desired recipients 318, i.e., children or other parent, prompted to enter a message title 320 and the content 322 of the message. Upon completion of the message the user simply selects "send" 324 to deliver the message to the desired recipients. Similar to a standard e-mail system, the recipient of the message may respond 326 to the message if desired. All users are provided with the ability to delete messages 328.

III. Information Bank Function

The information bank function 400 of the tool 10 enables the parent users to store information about each member of the family. The information is already organized by the tool 10 into the following sections: (1) Activities 402; (2) Address Book 404; (3) Child Care Providers 406; (4) Family Vitals 408; (5) Financial Information 410; (6) School Information 412; (7) Religious Information 414; (8) My Files 416; and (9) Medical Information 418, see FIG. 1. Each section is provided with its own template or templates for entering the information.

For example, the activity 402 section of the information bank 400 enables the user to enter detailed information about an activity via the "new activity" template 420 presented in FIG. 15. A similarly configured template is provided for a "new address" and a "new child care provider."

Figure 17:
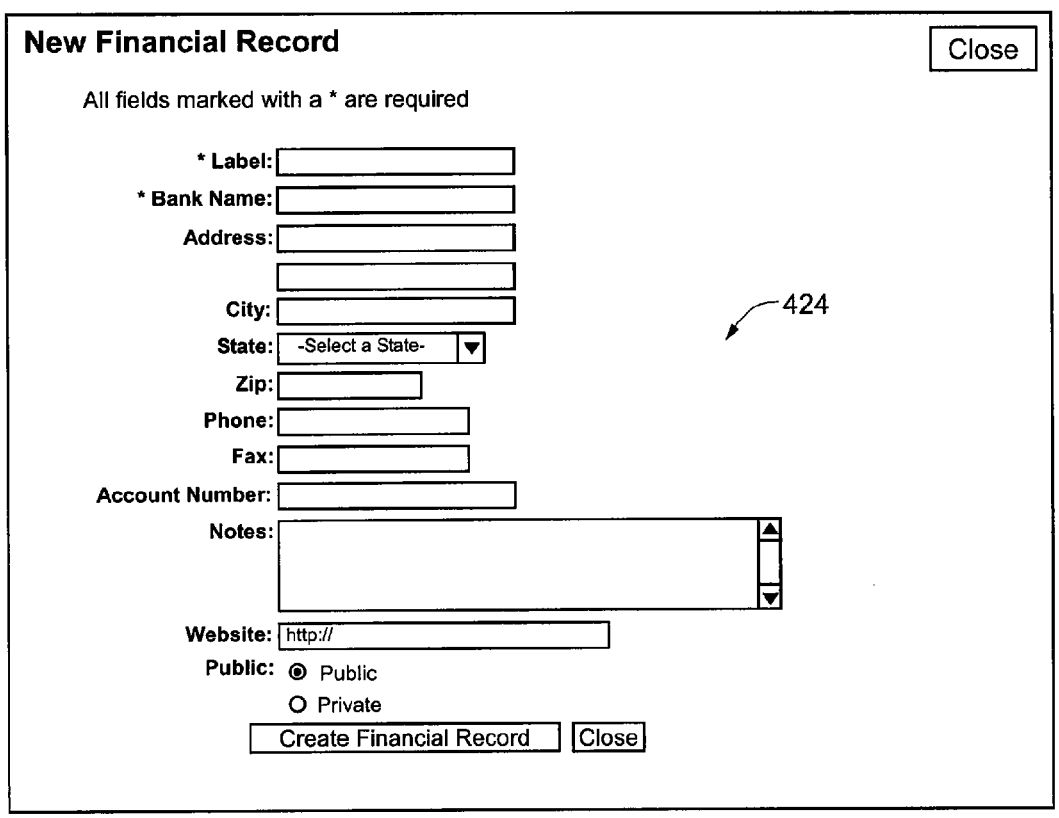
FIG. 17 depicts a "new financial record" template of the present invention.

FIG. 16 is an example of the template 422 that is preferably used to enter/edit "family vitals" while FIG. 17 provides an example of the template 424 that is preferably used to enter a "financial record." Similar templates are provided for a "new school," "new religious information," as well as medical information such as medical providers, insurance information, immunizations, emergency contacts, and health details. The user of the tool 10 is also provided with the option of uploading their own files for easy access and use within the tool 10, see FIG. 18 for an upload template 426.

IV. Expense Log Function

The expense log function 500 of the tool 10 allows the parent to enter expenses for their children, categorize the expense by type, and track the other parent's approval and payment. The expense types are customizable to facilitate each individual's needs. Upon entering the expense log function 500, the user is presented with an expense log summary 502 page, as shown in FIG. 19. All expense entries made by each parent are displayed, except those designated private. Specifically, the summary 502 includes the date 504 of the expense, a description of the expense 506, the type of expense 508, the amount of the expense 510, an indication of which child the expense is for 512, an indication of which parent posted the expense 514, the status of the expense 516, and whether the expense has been paid 520. A color-coded legend 522 is preferably provided at the bottom of the summary 502 to indicate the color block associate with each child and parent. A status legend 524 is also preferably provided at the bottom of the summary to indicate the various status' of expenses, including: (1) approved, indicating the expense has been approved by the other parent; (2) private, indicating the expense is not to be shown to the other parent; (3) refused, indicating the other parent refused to pay their portion of the expense; and (4) waiting, indicating the user is still waiting for a response from the other parent as to whether the expense is approved or not. In the preferred embodiment, the user is also provided with the option of selecting a specific expense from the summary to obtain a detailed view of the expense.

A user may create a new expense by selecting the "create expense" option 526 from the summary 502, upon which the user is presented with the "new expense" template 528 of FIG. 20. Through the template 528, the user may enter the date of the expense 530, the expense title 532, the type of expense 534, the amount of the expense 536, and which child the expense is for 538. The user may additionally upload a copy of the receipt if desired through use of the browse function 540. The user can indicate if the new expense is to be kept private or not, per selection 542. Upon creating the expense, it is posted to the expense log summary 502.

Figure 21:
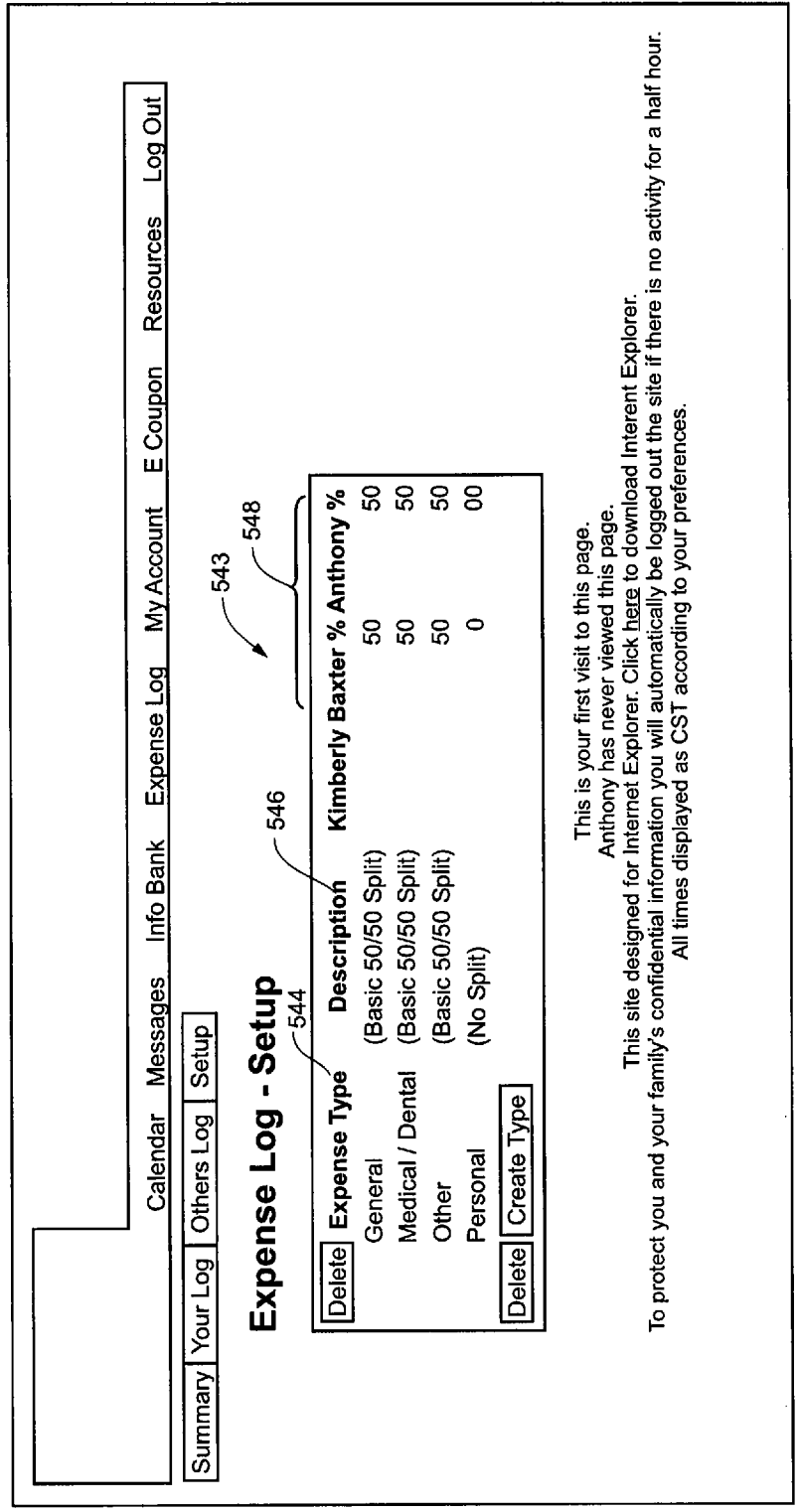
FIG. 21 depicts the expense log setup for defining expense types and how they are to be split among parents.
Figure 22:
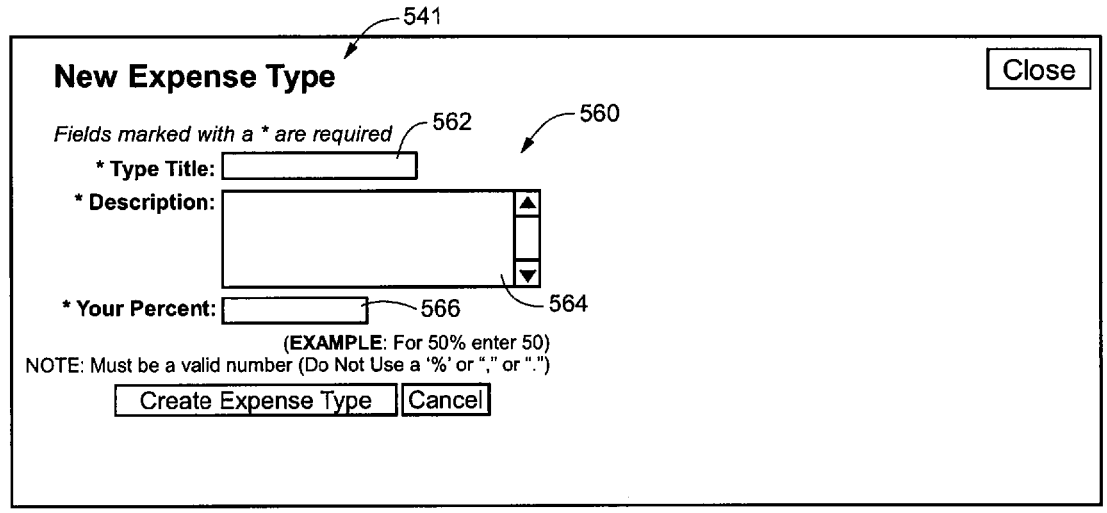
FIG. 22 depicts a template for defining a new expense type.

The expense log function 500 of the tool 10 enables the user to create different types of expenses. For example, see the setup page 543 of FIG. 21, wherein the expense types 544 of general, medical/dental, other, and personal have already been established. The description 546 of the expense type indicates how the expense is to be split while the actual percentages to be paid by each parent are listed under the parent's names 548. A new expense type is established through the template 560 of FIG. 22, wherein the user enters the type title 562, the description 564 and the percentage 566 that the user will pay. Through this expense type setup the user is able to customize the tool 10 to their specific needs.

V. My Account Function

The "my account" function 600 of the tool 10 provides the means to maintain the user's personal information including home and business addresses, phone numbers, e-mail addresses, etc. It further enables the storage of the user's site preferences, such as the colors desired to represent each child and parent, as well as enable the user to establish and save their own "quick list," a list of the most frequently used pages within the tool for quick and easy access to those pages. The "my account" function 600 also enables the user to add, edit, and delete child accounts and/or "view only" accounts.

VI. E-Coupon Function

The e-coupon function 700 of the tool 10 allows member users to have the benefit of access to e-coupons that the tool provider has worked to secure for their members. E-coupons are provided in such areas as books, communication, home improvement, photograph, travel, clothing, health, pets, and recreation among others. Members can simply select the coupon they desire and print it for their use.

VII. Resources Function

The resources function 800 of the tool 10 provides links to web sites and services for member users that are focused on families and children. It becomes very difficult to determine which sites are appropriate for the members of a user's family. The resource section supplies families with children, family oriented sites that the tool provider believes will educate, guide, and entertain the user members and their families. The links to resources are provided in such areas as family resources, internet safety tips, consumer safety tips, tools for families, links to filtering software, and reporting trouble online, among others.

VIII. Log Out Function

The log out function 900 of the tool enables the user to end their session with the tool 10. After logging out, all data about the current tool session is removed from the user's computer and from the tool provider's temporary database.

An additional feature that applies to all functions noted above is that of a date and time stamp. Every page within the tool 10 web site is marked in the footer with the last time each person viewed the page. Individual entries are all recorded with who performed the entry and at what time the entry was performed. See, for example, item 902 in FIGS. 3 and 4. Another feature that applies to all function is that of protected entries. Only the user who created an entry within the tool 10 is able to edit or delete it, and all historical records are locked unless both parents consent to making the change.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A computer based access schedule system for managing, scheduling, and sharing of information related to day-based obligatory commitments of a plurality of parents of a blended family regarding at least one child of said blended family for which said plurality of parents are responsible, comprising:

a first computing device including at least one processor;

instructions executable on said at least one processor adapted to cause said first computing device to:

define a set of at least two parents for each of said at least one child of said blended family, who each have day-based obligatory commitments regarding said at least one child, and wherein there is at least one parent of said set of parents assigned to at least one day-based obligatory commitment for each of said at least one child for each day of the week for an indicated time period;

accept from at least one authorized user, including users other than said set of parents, information relating to day-based obligatory commitments of said set of parents;

store information relating to said day-based obligatory commitments of said set of parents, including at least date information for each of said day-based obligatory commitments;

generating a web page viewable by a user through a display coupled to a second computing device communicatively coupled to said first computing device over a network, the web page including a visual representation of an access schedule, wherein said access schedule is based on said information stored relating to said day-based obligatory commitments and includes at least one indication of which parent of said set of parents has a day-based obligatory commitment regarding said at least one child of said blended family for each day of the week for said indicated time period, wherein said instructions executable on said at least one processor are adapted to cause said first computing device to provide at least one user un-modifiable indication of a last time each parent of said set of parents accessed said access schedule by providing the web page to the second computing device, wherein the user un-modifiable indication is accessible via the first computing device; and wherein the webpage is viewable by an authorized third party other than the set of parents generating and providing to a first parent a request form presenting at least one second parent of said set of parents and enabling said first parent to electronically request, by submission of said form, from said second parent a proposed swap of one or more day-based obligatory commitments initially assigned to said first parent in exchange for one or more day-based obligatory commitments initially assigned to said second parent, said request form comprising:

a parent selection field arranged such that said first parent is provided an ability to electronically select at least one parent of said set of parents to request said proposed swap from;

a date designation field arranged such that said first parent is provided an ability to electronically select one or more proposed dates of said one or more day-based obligatory commitments assigned to said first parent for which said proposed swap of the day-based obligatory commitment assigned to said second parent is desired;

a trade indication field providing said first parent an ability to indicate an offer to trade for one or more day-based obligatory commitments initially assigned to said first parent;

a respond by field arranged such that said first parent is provided an ability to electronically input a date so as to indicate a time period for which said request for said proposed swap is valid;

process information input through said request form to determine whether any scheduling conflicts based on said information stored relating to said day-based obligatory commitments have been or will be caused by said proposed swap, wherein if a scheduling conflict exists, provide an indication of said conflict, and wherein if a scheduling conflict does not exist, process said information input through said request form in order to provide an indication on said access schedule of the request, wherein said indication is provided as a selectable icon associated with one or more dates on said access schedule such that user selection of said selectable icon provides a user with details of said proposed swap;

upon receiving an indication of said first parent selection of said selectable icon, further provide said first parent with an ability via said access schedule to electronically submit or withdraw said proposed swap;

upon receiving said user selection to submit said proposed swap, provide to other users through a display coupled to a third computing device communicatively coupled to said first computing device over a network a web page that includes a visual representation of said access schedule updated to include said proposed swap;

monitor said proposed swap via said updated access schedule so as to allow said second parent to accept or reject said proposed swap only during said time period for which said request for said proposed swap is valid;

provide a status indication to said first parent indicating whether or not said second parent has viewed said proposed swap; and upon receiving an indication of said second parent to accept said proposed swap, automatically update said access schedule and publish said access schedule through a display coupled to a computing device communicatively coupled to said first computing device over a network a web page that includes a visual representation of said access schedule updated to reflect on said access schedule that said first parent is responsible for said one or more commitments initially assigned to said other, second parent as indicated in said proposed swap and said second parent is responsible for said one or more commitments initially assigned to said first parent as indicated in said proposed swap.

2. The system of claim 1, wherein said instructions executable on said at least one processor adapted to cause said first computing device to accept from a user information relating to day-based obligatory commitments of said set of parents includes information relating to day-based obligatory commitments of genetic parents, legal parents, spouses of parents, grandparents, siblings, or other members of a blended family who are responsible for said one or more children.

3. The system of claim 1, wherein said at least one indication of a day-based obligatory commitment of said at least one parent of said set of parents includes at least one color code indicating which parent of said set of parents has said day-based obligatory commitment.

4. The system of claim 3, wherein said instructions executable on said at least one processor adapted to cause said first computing device further include instructions to, upon receiving said indication of said second parent to accept said proposed swap, automatically update said access schedule to update said color code for said day-based obligatory commitment to reflect a swap of responsibilities between said first parent and said second parent; and upon receiving said indication of said second parent to reject said proposed swap, automatically maintain an existing color code for said day-based obligatory commitment.

5. The system of claim 1, wherein said at least one indication of a day-based obligatory commitment of at least one parent of said set of parents includes at least one color code indicating one or more children among a plurality of children of said blended family for who said parent has said day-based obligatory commitment.

6. A computer based method of managing, scheduling, and sharing information among parents and children of blended families, comprising:

at a computer server system coupled to a network, defining a set of at least two parents for each of said at least one child of said blended family, who are permitted to have commitments regarding said at least one child, and wherein there is at least one parent of said set of parents assigned to at least one commitment for each of said at least one child for each day of the week for an indicated time period;

accepting from at least one authorized user, including authorized users other than said set of parents via a first computing device including at least one processor communicatively coupled to said server system over said network, information relating to commitments of said set of parents;

storing, at a computer readable medium coupled to said server system, information relating to said commitments of said set of parents, including at least date information for each of said commitments;

generating and providing, to a user through a display coupled to a second computing device communicatively coupled to said server system over said network a web page, said web page including a visual representation of an access schedule, wherein said access schedule is based on said information stored relating to said commitments, said access schedule including at least one indication of which parent of said set of parents has a commitment regarding at least one child of said blended family for each day of the week for said indicated time period;

generating and providing, to a user, including authorized users other than said set of parents, through the display, at least one user un-modifiable indication of a last time each parent of said set of parents accessed said access schedule by providing on the web page an indication of the last date and time each user viewed the web page;

generating and providing to a first parent through a display coupled to a computing device communicatively coupled to said server system over said network a request form presenting at least one second parent of said set of parents and enabling said first parent to electronically request from said second parent a proposed swap of one or more commitments initially assigned to said first parent for one or more commitments initially assigned to said other, second parent, said providing said request form including:

generating and providing a parent selection field arranged such that said first parent is provided an ability to electronically select at least one of said second parent of said set of parents to request said proposed swap from;

generating and providing a date designation field arranged such that said first user is provided an ability to electronically select one or more proposed dates of said one or more commitments of said first parent on which said proposed swap of the day-based obligatory commitment assigned to said second parent is desired;

generating and providing a trade indication field providing said first parent an ability to indicate an offer to trade for one or more day-based obligatory commitments initially assigned to said first parent;

generating and providing a respond by field arranged such that said first parent is provided an ability to electronically input a date so as to indicate a time period for which said request for said proposed swap is valid;

causing information input through said request form to be processed so as to determine whether any scheduling conflicts based on said information stored relating to said commitments have been or will be caused by said proposed swap by comparing said information input through said request form to information stored relating to said commitment;

if a scheduling conflict exists, providing to said first parent through a display coupled to a computing device communicatively coupled to said server system over said network an indication of said conflict;

if a scheduling conflict does not exist, causing said information input through said request form to be processed in order to provide to a user through a display coupled to a computing device communicatively coupled to said server system over said network an indication on said access schedule of said request, wherein said indication is provided as a selectable icon associated with one or more dates on said access schedule such that user selection of said selectable icon provides a user with details of said proposed swap;

upon receiving said first parent selection to submit said proposed swap, providing to other users through a second display coupled to a computing device communicatively coupled to said server system over said network a web page that includes a visual representation of said access schedule updated to include said proposed swap;

monitoring said proposed swap using said server system via said updated access schedule and allowing said second parent to accept or reject said proposed swap only during said time period for which said request for said proposed swap is valid;

providing a status indication to said first parent indicating whether or not said second parent has viewed said proposed swap; and upon receiving an indication of said second parent to accept said proposed swap, causing said server system to automatically update said access schedule and publishing said access schedule through a display coupled to a computing device communicatively coupled to a computing device over said network a web page that includes a visual representation of said access schedule and reflecting on said access schedule that said first parent is responsible for said one or more commitments initially assigned to said other, second parent as indicated in said proposed swap and said second parent is responsible for said one or more commitments initially assigned to said first parent as indicated in said proposed swap.

7. The method of claim 6, wherein said providing, to a user through a display coupled to a computing device communicatively coupled to said server system over said network a web page, said web page including a visual representation of an access schedule, wherein said access schedule is based on said information stored relating to said commitments, said access schedule including at least one indication of a commitment of at least one parent of said set of parents regarding an event involving at least one child of said blended family includes indicating:

a start time for an event;
an end time for an event;
one or more dates for an event;
what child among a plurality of children of said blended family said event is related to;
what parent of said set of parents is committed to drop off said one or more children of said blended family at an event;
what parent of said set of parents is committed to remain with said one or more children of said blended family for a duration of an event;
what parent of said set of parents is committed to pick up said one or more children of said blended family from an event.

8. The system of claim 6, wherein said providing, to a user through a display coupled to a computing device communicatively coupled to said server system over said network a web page, said web page including a visual representation of an access schedule, wherein said access schedule is based on said information stored relating to said commitments, said access schedule including at least one indication of a commitment of at least one parent of said set of parents regarding an event involving at least one child of said blended family includes providing at least one color code indicating which parent of said set of parents has said commitment.

9. The method of claim 8, wherein automatically updating said access schedule and publishing said access schedule through a display coupled to a computing device communicatively coupled to said server system over said network a web page that includes a visual representation of said access schedule and reflecting on said access schedule that said first parent is responsible for said one or more commitments initially assigned to said other, second parent as indicated in said proposed swap and said second parent is responsible for said one or more commitments initially assigned to said first parent in said proposed swap includes automatically updating said access schedule to update said color code to reflect on said access schedule that said first parent is responsible for said one or more commitments initially assigned to said other, second parent as indicated in said proposed swap and said second parent is responsible for said one or more commitments initially assigned to said first parent as indicated in said proposed swap.

10. The method of claim 6, wherein said providing, to a user through a display coupled to a second computing device communicatively coupled to said server system over said network a web page, said web page including a visual representation of an access schedule, wherein said access schedule is based on said information stored relating to said commitments, said access schedule including at least one indication of a commitment of at least one parent of said set of parents regarding an event involving at least one child of said blended family includes providing at least one color code indicating which child among a plurality of children is associated with said event.

11. The method of claim 6, wherein said at least one commitment is a day-based obligatory commitment.

12. A computer implemented method comprising:
   storing a schedule on a computer readable storage device for a child defining periods the child is scheduled to spend with each of two parents;
   providing access to the schedule to each parent via networked computing devices;
   providing a swap form to facilitate selection of two different proposed periods to swap between the parents by one parent;
   providing the selected proposed periods to swap by one parent to the other parent as a schedule swap;
   allowing the other parent to accept the schedule swap; and
   changing the stored schedule of the child to reflect the swap of periods when accepted by the other parent, wherein access to the schedule and the swap form are presented to the parents and an authorized third party user as web pages with time stamps representative of the last time the web pages were viewed by each parent, wherein the computer tracks when the web pages was provided to the other parent, and wherein the web pages provide at least one user un-modifiable indication of a last time each parent of said set of parents accessed said access schedule.

13. The computer implemented method of claim 12 wherein periods on the schedule are color coded with a parent unique color to associate periods with parents.

* * * * *